US012665754B2

(12) United States Patent
Mera et al.

(10) Patent No.: US 12,665,754 B2
(45) Date of Patent: Jun. 23, 2026

(54) KEY MANAGEMENT DEVICE, QUANTUM CRYPTOGRAPHY COMMUNICATION SYSTEM, KEY MANAGEMENT METHOD, AND COMPUTER PROGRAM PRODUCT

(71) Applicant: KABUSHIKI KAISHA TOSHIBA, Tokyo (JP)

(72) Inventors: Keisuke Mera, Tokyo (JP); Koji Kanazawa, Tokyo (JP); Katsuyuki Kimura, Kamakura Kanagawa (JP); Yoshimichi Tanizawa, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 251 days.

(21) Appl. No.: 18/457,598

(22) Filed: Aug. 29, 2023

(65) Prior Publication Data

US 2024/0297784 A1     Sep. 5, 2024

(30) Foreign Application Priority Data

Mar. 3, 2023    (JP) ................................. 2023-032520

(51) Int. Cl.
　　*H04L 29/06*　　　(2006.01)
　　*H04L 9/08*　　　(2006.01)
(52) U.S. Cl.
　　CPC .......... *H04L 9/0858* (2013.01); *H04L 9/0819* (2013.01)
(58) Field of Classification Search
　　CPC ............................ H04L 9/0858; H04L 9/0819
　　See application file for complete search history.

(56) References Cited

U.S. PATENT DOCUMENTS

2008/0035751 A1　2/2008　Martin et al.
2015/0271147 A1　9/2015　Tanizawa et al.
2016/0197723 A1　7/2016　Takahashi et al.
(Continued)

FOREIGN PATENT DOCUMENTS

JP　　2008-036633 A　　2/2008
JP　　2015-179989 A　　10/2015
(Continued)

OTHER PUBLICATIONS

Japan Patent Office, Decision to Grant a Patent in JP App. No. 2023-032520 (Jul. 29, 2025).

*Primary Examiner* — Evans Desrosiers
(74) *Attorney, Agent, or Firm* — Finnegan, Henderson, Farabow, Garrett & Dunner, LLP

(57) ABSTRACT

According to one embodiment, a key management device includes an acquiring circuitry and a processor. The acquiring circuitry is configured to: acquire identity verification data of a remote QKD key generated by a remote QKD device, and remote QKD device identification information identifying the remote QKD device, from another key management device via a classical communication channel. The processor is configured to: collect a local QKD key generated by a local QKD device and local QKD device identification information identifying the local QKD device; generate identity verification data of the local QKD key; and map, when the identity verification data of the remote QKD key matches the identity verification data of the local QKD key, the remote QKD device identification information to the local QKD device identification information.

15 Claims, 7 Drawing Sheets

(56)     References Cited

U.S. PATENT DOCUMENTS

2016/0248581 A1*   8/2016  Fu ........................ H04L 9/0858
2021/0083864 A1*   3/2021  Bush ..................... H04L 9/088
2024/0313950 A1     9/2024  Tanaka et al.

FOREIGN PATENT DOCUMENTS

JP              6426477  B2    11/2018
JP              6599401  B2    10/2019
WO     WO 2022/264373  A1    12/2022

* cited by examiner

FIG.1

START

S1
COLLECT QKD KEY AND QKD
MODULE ID

S2
TRANSMIT QKD KEY IDENTITY
VERIFICATION DATA AND QKD
MODULE ID

S3
RECEIVE QKD KEY IDENTITY
VERIFICATION DATA AND QKD
MODULE ID

S4
IDENTIFY QKD MODULE ID WITH
MATCHING QKD KEY IDENTITY
VERIFICATION DATA

END

KEY MANAGEMENT DEVICE, QUANTUM CRYPTOGRAPHY COMMUNICATION SYSTEM, KEY MANAGEMENT METHOD, AND COMPUTER PROGRAM PRODUCT

CROSS-REFERENCE TO RELATED APPLICATIONS

This application is based upon and claims the benefit of priority from Japanese Patent Application No. 2023-032520, filed on Mar. 3, 2023; the entire contents of which are incorporated herein by reference.

FIELD

Embodiments described herein relate generally to a key management device, a quantum cryptography communication system, a key management method, and a computer program product.

BACKGROUND

Quantum key distribution technology (QKD) is a technology for enabling a QKD key (quantum key) to be shared securely between QKD devices that are connected over an optical fiber, by causing one of the QKD devices to transmit single photons successively and the other to receive the single photons.

However, when there are a plurality of QKD devices, it has not been easy for conventional technologies to map a pair of QKD devices for sharing a QKD key.

BRIEF DESCRIPTION OF THE DRAWINGS

FIG. 1 is a schematic illustrating an exemplary device configuration of a quantum cryptography communication system according to a first embodiment;

DETAILED DESCRIPTION

Figure 2:
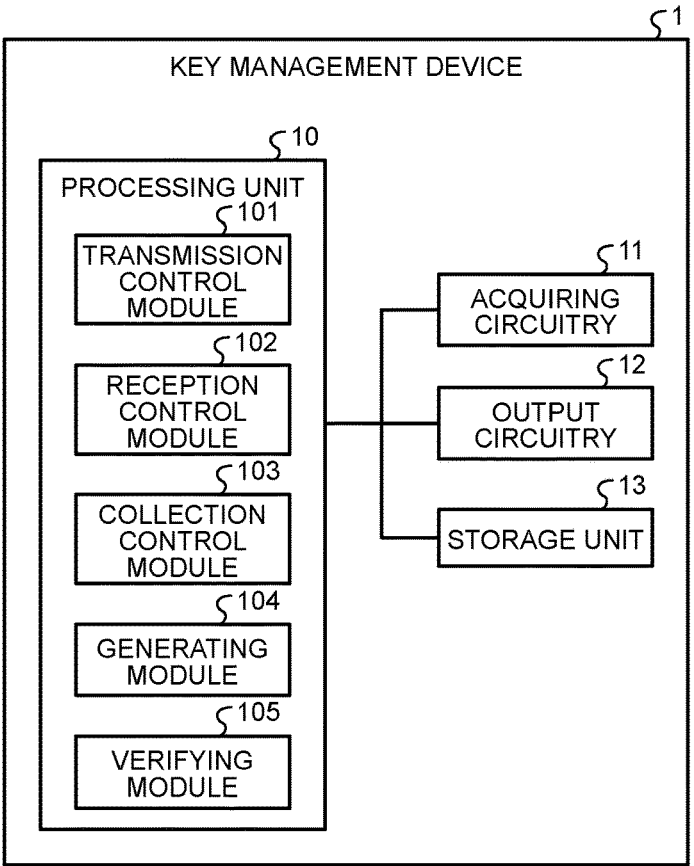
FIG. 2 is schematic illustrating an exemplary functional configuration of a key management device according to the first embodiment.

In general, according to one embodiment, a key management device, which is connected to at least one local quantum key distribution (QKD) device connected to at least one remote QKD device via a quantum communication channel, includes an acquiring circuitry and a processor. The acquiring circuitry is configured to: acquire identity verification data of a remote QKD key generated by the remote QKD device, and remote QKD device identification information identifying the remote QKD device, from another key management device via a classical communication channel. The processor is configured to: collect a local QKD key generated by the local QKD device, and local QKD device identification information identifying the local QKD device; generate identity verification data of the local QKD key; and map, when the identity verification data of the remote QKD key matches the identity verification data of the local QKD key, the remote QKD device identification information to the local QKD device identification information.

Exemplary embodiments of a key management device, a quantum cryptography communication system, a key management method, and a computer program product will be explained below in detail with reference to the accompanying drawings. The present invention is not limited to the following embodiments.

In order to establish mapping of QKD modules based on a QKD key, the key management device needs to transmit or to receive the QKD key or a hash value characterizing the QKD key data over a classical communication channel where the QKD key data is exposed to the risk of eavesdropping. Therefore, conventionally, a key management device has not been provided with a function for transmitting or receiving a QKD key used in encryption. The key management device may have a function that uses the QKD key to encrypt and to transmit another key that is different from the QKD key (e.g., application key), but this is not a function for transmitting or receiving QKD key data used in encryption by the key management device.

Some embodiments for aiding identification of a QKD module by mapping QKD modules using a QKD key will now be explained.

First Embodiment

Figure 1:
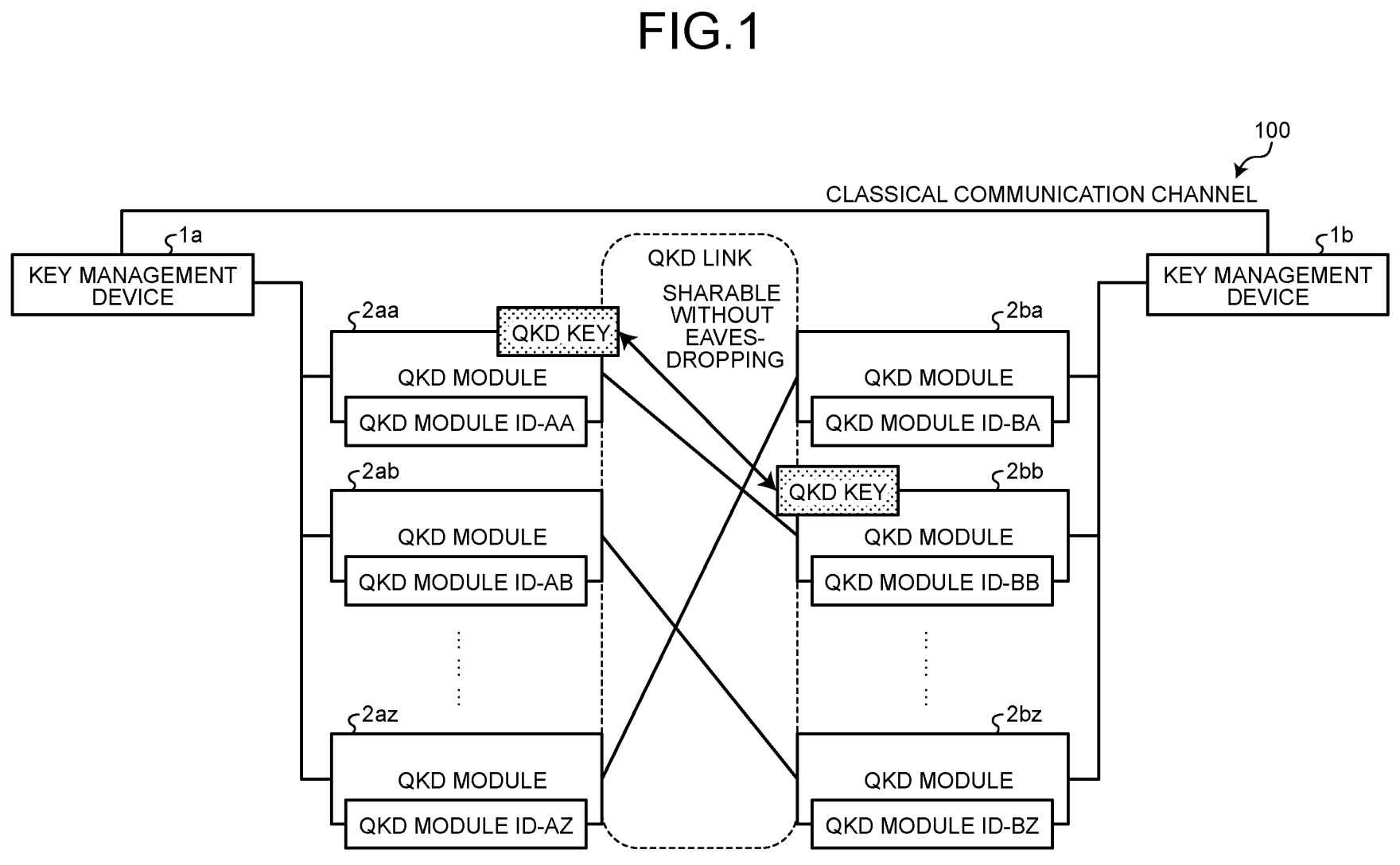

FIG. 1 is a schematic illustrating an exemplary device configuration of a quantum cryptography communication system 100 according to a first embodiment. This quantum cryptography communication system 100 according to the first embodiment includes key manager (KM) devices 1a to 1b, QKD modules 2aa to 2az, and QKD modules 2ba to 2bz.

The key management devices 1a and 1b are mapped to each other, and are connected to each other over a classical communication channel. The communication scheme of the classical communication channel may be wired communication or wireless communication. The classical communication channel may use a combination of wired communication and wireless communication.

The key management device 1a is connected to the QKD modules 2aa to 2az over the wire or wirelessly. In the same manner, the key management device 1b is connected to the QKD modules 2ba to 2bz over the wire or wirelessly.

The QKD modules 2aa to 2az and the QKD modules 2ba to 2bz are connected to each other via a QKD link, and performs quantum key distribution (QKD). A pair of QKD modules that are connected to each other via a QKD link executes QKD to share the same QKD key (quantum key). For example, by executing the QKD, the pair of QKD modules 2aa and 2bb can share the same QKD key without any risk of eavesdropping.

The configuration illustrated in FIG. 1 is merely an example, and the exemplary device configuration of the quantum cryptography communication system 100 is not limited to that illustrated in FIG. 1. For example, the numbers of the QKD modules 2aa to 2az and the QKD modules 2ba to 2bz may be any number, and the numbers of the QKD modules 2aa to 2az and the QKD modules 2ba to 2bz are not limited to the example illustrated in FIG. 1.

A QKD link is a quantum communication channel used in transmitting a single photon. Typically, a QKD link is an independent optical fiber, one of a plurality of channels that are multiplexed over an optical fiber, a core included in a multi-core fiber, or a free-space optical communication channel.

Hereinafter, when the QKD modules 2aa to 2az are not distinguished from one another, these QKD modules will be simply referred to as QKD modules 2a. In the same manner, when the QKD modules 2ba to 2bz are not distinguished from one another, these QKD modules will be simply referred to as QKD modules 2b.

Even if there is any third party eavesdropping data on the QKD link, the QKD can detect eavesdropping almost always, due to restrictions of the quantum physics. Therefore, a pair of QKD modules 2a and 2b (e.g., the QKD modules 2aa and 2bb) are characterized by a capability for sharing a QKD key not having been eavesdropped by almost anyone.

The key management device 1a receives a QKD key from the QKD module 2a, and the key management device 1b receives a QKD key from the QKD module 2b. One of the key management devices 1a and 1b encrypts data using the QKD key, and transmits the encrypted data over a classical communication channel. The other key management device decrypts the encrypted data using the QKD key that is the same as the QKD key used in the encryption.

The QKD key used by the key management devices 1a and 1b in encryption and decryption always need to be the same data. This is because encrypted data cannot be decrypted with different data.

Furthermore, the key management devices 1a and 1b do not transmit the QKD key used in encryption and decryption over a classical communication channel between these devices. If the QKD key used in the encryption and decryption is transmitted over a classical communication channel the communication over which is eavesdropped by an eavesdropper, the QKD key and data encrypted by the QKD key will be both known to the eavesdropper. This is because, with the key, the eavesdropper can decrypt the encrypted data. Therefore, the key management devices 1a and 1b do not perform encryption and decryption using a QKD key transmitted over a classical communication channel.

As mentioned earlier, the key management devices 1a and 1b need to use the same QKD key in the encryption or the decryption. As illustrated in FIG. 1, as a challenge in a configuration in which there are a plurality of pairs of QKD modules 2a and 2b, the key management device 1a needs to be set with a QKD key of the QKD module 2a that is to be used in encryption. In the same manner, the key management device 1b needs to be set with a QKD key of the QKD module 2b that is to be used in decryption. However, when there are a large number of pairs of QKD modules 2a and 2b, while it is possible to map pairs QKD modules 2a and 2b manually, such an approach accrues high engineering cost when there are many QKD modules 2a and 2b.

In order to reduce the labors in setting, a configuration and a method for making it easier to map (e.g., automate mapping of) pairs of QKD modules 2a and 2b will now be explained in detail.

When the key management devices 1a and 1b are not distinguished from one another, the key management devices will be simply referred to as the key management device 1. In the same manner, the QKD modules 2aa to 2az and the QKD modules 2ba to 2bz are not distinguished from one another, the QKD modules will be simply referred to as QKD modules 2.

Exemplary Functional Configuration

FIG. 2 is a schematic illustrating an exemplary functional configuration of the key management device 1 according to the first embodiment. The key management device 1 according to the first embodiment includes a processing unit 10, an acquiring circuitry 11, an output circuitry 12, and a storage unit 13. The processing unit 10 includes a transmission control module 101, a reception control module 102, a collection control module 103, a generating module 104, and a verifying module 105.

The key management device 1 according to the first embodiment enables automatic identification of a pair of QKD modules 2 (examples of a QKD device) by mapping the QKD modules 2 to each other using a QKD key.

The processing unit 10 is implemented as at least one processor, and executes a process of the key management device 1. This processor includes a controller unit and an operator unit, for example, and is implemented as an analog or digital circuit, for example. The processor may be a central processing unit (CPU), a general-purpose processor, a microprocessor, a digital signal processor (DSP), an application-specific integrated circuit (ASIC), a field-programmable gate array (FPGA), or a combination thereof.

The acquiring circuitry 11 acquires data via wireless or wired communication. For example, the acquiring circuitry 11 in the key management device 1a acquires identity verification data for the QKD key generated by the QKD module 2b, and a QKD module ID for identifying the QKD module 2b (an example of QKD device information) from the key management device 1b via the classical communication channel.

The output circuitry 12 outputs data by establishing wireless or wired communication. For example, the output circuitry 12 in the key management device 1a outputs the identity verification data for the QKD key generated by QKD module 2a, and the QKD module ID of the QKD module 2a to the key management device 1b.

The storage unit 13 stores therein data such as a QKD key, identity verification data of the QKD key, and the QKD module ID for identifying the QKD module 2 having generated the QKD key. The storage unit 13 is implemented as a non-volatile memory (auxiliary storage device 403 in FIG. 9, which will be described later) or another storage device, for example.

The transmission control module 101 controls the output circuitry 12 to transmit the QKD key identity verification data and the QKD module ID to the remote key management device 1 connected via the classical communication channel, over the classical communication channel.

Hereinafter, the key management device 1b connected to the key management device 1a via the classical communication channel, and the QKD module 2b connected to the same network as the key management device 1b will be referred to as a remote key management device 1b and a remote QKD module 2b, respectively, for the key management device 1a. By contrast, the QKD module 2a connected to the same network as the key management device 1a will be referred to as a local QKD module 2a, for the key management device 1a.

The QKD key identity verification data is data used in verifying the identity of the QKD key. An example of the QKD key identity verification data is the whole or a part of the generated QKD key having a predetermined length. Another example of the QKD key identity verification data is a hash value generated from the whole or a part of the generated QKD key having a predetermined length. The QKD key identity verification data preferably includes a QKD key ID for identifying the QKD key, although it is not mandatory.

A QKD module ID is identification information for identifying a QKD module. There are various forms of the QKD module ID. For example, the QKD module ID may be the MAC address, an IPv4 address, and an IPv6 address, a host name shared with the Domain Name System (DNS) or the multicast DNS (mDNS), or a fully qualified domain name (FQDN), which are assigned to the QKD module, or an identifier set to a function running on the QKD module, or a hash value generated therefrom. As another example, the QKD module ID is a combination of the MAC address, an IPv4 address, an IPv6 address, a DNS, a host name, an FQDN, or an identifier, or a hash value generated from the combination.

The reception control module 102 controls the acquiring circuitry 11 to receive the QKD key identity verification data and the QKD module ID from the remote key management device 1 connected thereto via the classical communication channel, over the classical communication channel.

At this time, each of the key management device 1a and the key management device 1b may include one of the transmission control module 101 and the reception control module 102. For example, the key management device 1a may include the transmission control module 101, and the key management device 1b may have the reception control module 102.

It is more preferable for the key management device 1 to include both of the transmission control module 101 and the reception control module 102.

The collection control module 103 collects the QKD key generated by the local QKD module 2 connected to the key management device 1, and the QKD module ID of the local QKD module 2 connected to the key management device 1.

The generating module 104 generate QKD key identity verification data from the QKD key. For example, the generating module 104 generates QKD key identity verification data representing the whole or a part of the QKD key. As another example, the generating module 104 generates a hash value from the whole or a part of the QKD key, and then generates QKD key identity verification data representing the hash value.

The verifying module 105 verifies the identity QKD key based on a plurality of pieces of QKD key identity verification data. The processing unit 10 encrypts or decrypts data uses a newly generated QKD key that is different from the QKD key used in generating the QKD key identity verification data.

Figure 3:
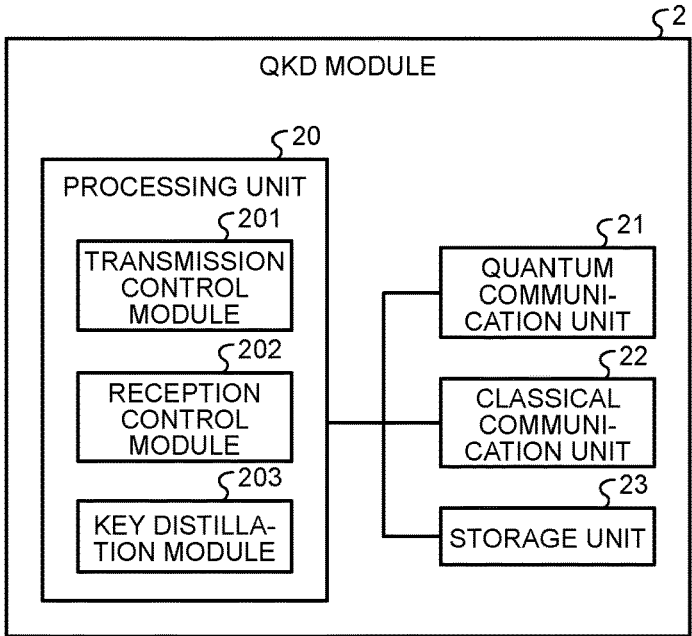
FIG. 3 is a schematic illustrating an exemplary functional configuration of a QKD module according to the first embodiment.

FIG. 3 is a schematic illustrating an exemplary functional configuration of the QKD module 2 according to the first embodiment. The QKD module 2 according to the first embodiment includes a processing unit 20, a quantum communication unit 21, a classical communication unit 22, and a storage unit 23. The processing unit 20 includes a transmission control module 201, a reception control module 202, and a key distillation module 203.

The processing unit 20 executes processes of the QKD module 2. As the implementation of the processing unit 20, any of the implementations of the processing unit 10 described above can be used.

The quantum communication unit 21 generates a QKD key by performing communication via the QKD link (quantum communication channel) described above.

The classical communication unit 22 establishes communication via the classical communication channel described above. For example, the classical communication unit 22 transmits data such as a pair of a QKD module key and QKD module ID to the key management device 1.

The storage unit 23 stores therein data. Examples of the data stored in the storage unit 23 include a QKD key generated by a QKD module 2, and a QKD module ID for identifying a QKD module 2. As the implementation of the storage unit 23, any of the implementations of the storage unit 13 described above can be used.

The transmission control module 201 controls transmission of data via the quantum communication unit 21 or the classical communication unit 22. The reception control module 202 controls reception of data via the quantum communication unit 21 or the classical communication unit 22.

The key distillation module 203 generates a QKD key by applying a key distillation process to data shared between a transmitting QKD module 2 and a receiving QKD module 2 using QKD. The key distillation process includes error correction and privacy amplification.

Figure 4:
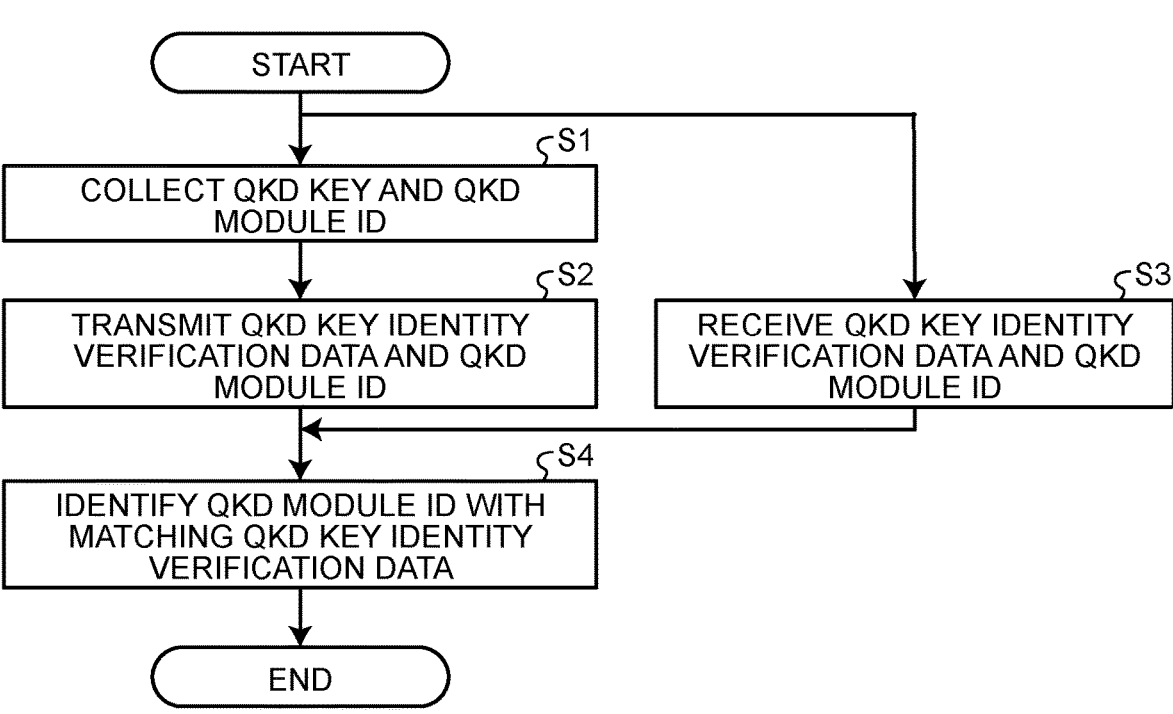
FIG. 4 is a flowchart illustrating an exemplary operation of the key management device according to the first embodiment.

FIG. 4 is a flowchart illustrating an exemplary operation of the key management device 1 according to the first embodiment. To begin with, the collection control module 103 collects, from each QKD module 2 (local QKD module 2) connected to the key management device 1, the QKD key and the QKD module ID of the local QKD module 2 (Step S1).

The transmission control module 101 then controls the output circuitry 12 to transmit the QKD key identity verification data and the QKD module ID to the remote key management device 1 (Step S2). The QKD key identity verification data is generated by the generating module 104 described above, from the QKD key collected at Step S1.

The reception control module 102 then controls the acquiring circuitry 11 to receive the QKD key identity verification data and the QKD module ID transmitted by the remote key management device 1 (Step S3). Received at Step S3 are the identity verification data generated by the remote key management device 1 from the QKD key collected from the remote QKD module 2, and the QKD module ID of the remote QKD module 2.

Steps S1 and S2, and Step S3 may be performed simultaneously in parallel, or may be performed at different timings.

The verifying module 105 identifies the QKD module ID of the local QKD module 2 and the QKD module ID of the remote QKD module 2 with matching the QKD key identity verification data of the local QKD module 2 and the QKD key identity verification data of the remote QKD module 2 (Step S4). When the pieces of the QKD key identity verification data match, the verifying module 105 maps the QKD module ID of the local QKD module 2 to the QKD module ID of the remote QKD module 2.

In this manner, a pair of QKD module IDs for identifying corresponding QKD modules 2 can be identified among a plurality of QKD modules 2 connected to the QKD link.

As described above, the key management device 1a according to the first embodiment is connected to at least one QKD module 2a (an example of a local QKD device) that is connected via the quantum communication channel to at least one QKD module 2b (an example of a remote QKD device). The acquiring circuitry 11 acquires identity verification data of the QKD key (an example of a remote QKD key) generated by the QKD module 2b (an example of a remote QKD device) and QKD module ID for identifying the QKD module 2b (an example of remote QKD device identification information), from the key management device 1b via the classical communication channel. The processing unit 10 collects the QKD key generated by the QKD module 2a (an example of a local QKD key), and the QKD module ID for identifying the QKD module 2a (an example of local QKD device identification information), generates identity verification data of the local QKD key, and, when the identity verification data of the remote QKD key matches the identity verification data of the local QKD key, maps the remote QKD device identification information to the local QKD device identification information.

With this, according to the first embodiment, even when there are a plurality of QKD devices, the QKD device pair sharing a QKD key can be easily mapped.

Second Embodiment

A second embodiment will now be explained. In the explanation of the second embodiment, explanations that are the same as those in the first embodiment will be omitted, and parts that are different from those in the first embodiment will be explained.

Exemplary Functional Configuration

Figure 5:
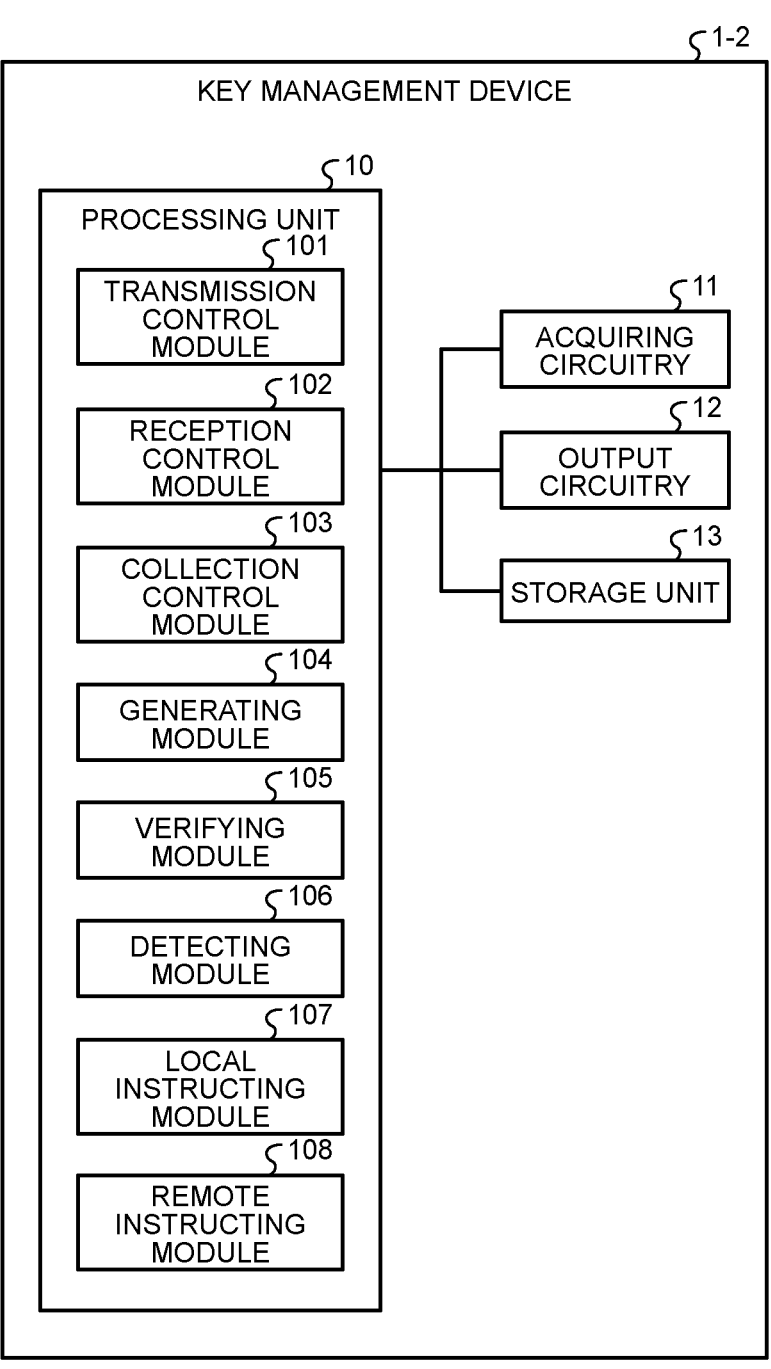
FIG. 5 is schematic illustrating an exemplary functional configuration of a key management device according to a second embodiment.

FIG. 5 is a schematic illustrating an exemplary functional configuration of a key management device 1-2 according to the second embodiment. The key management device 1-2 according to the second embodiment includes the processing unit 10, the acquiring circuitry 11, the output circuitry 12, and the storage unit 13. The processing unit 10 includes the transmission control module 101, the reception control module 102, the collection control module 103, the generating module 104, the verifying module 105, a detecting module 106, a local instructing module 107, and a remote instructing module 108. In the second embodiment, the detecting module 106, the local instructing module 107, and the remote instructing module 108 are further added to the configuration according to the first embodiment.

The detecting module 106 detects that a QKD module 2 to be newly connected to the QKD link is newly connected to the key management device 1-2.

The local instructing module 107 instructs the local QKD module 2 connected to the key management device 1-2 to generate a QKD key. For example, when the detecting module 106 detects a newly connected QKD module 2, the local instructing module 107 instructs the new QKD module 2 to generate a QKD key. As another example, upon receiving an instruction for generating a QKD key from another key management device 1-2, the local instructing module 107 instructs the local QKD module 2 connected to the key management device 1-2 to generate a QKD key.

The remote instructing module 108 instructs the remote key management device 1-2 connected thereto via the classical communication channel, to cause the remote QKD module 2 to generate a QKD key.

Figure 6:
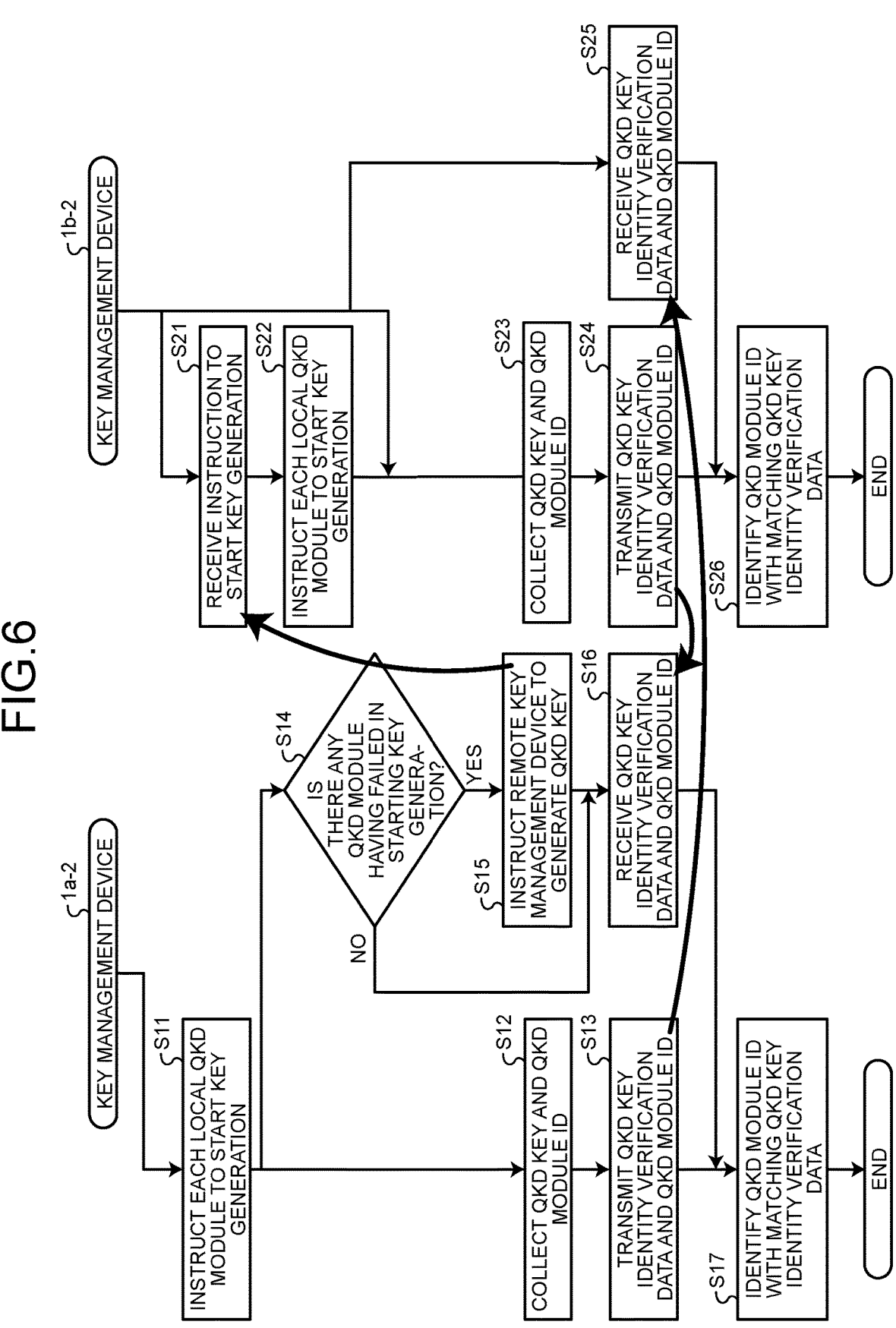
FIG. 6 is a flowchart illustrating an exemplary operation of the key management device according to the second embodiment.

FIG. 6 is a flowchart illustrating an exemplary operation of the key management device 1-2 according to the second embodiment. Illustrated in FIG. 6 is an example in which a key management device 1a-2 instructs a local QKD module 2a connected to the key management device 1a-2 to start a key generation, and a key management device 1b-2 instructs the QKD module 2b connected to key management device 1b-2 to start a key generation based on the instruction from the key management device 1a-2.

To begin with, the local instructing module 107 in the key management device 1a-2 instructs the local QKD module 2a connected to the key management device 1a-2 to start a key generation (Step S11).

It is more preferable, when the detecting module 106 detects a newly connected QKD module 2a, for the local instructing module 107 to give an instruction for starting the key generation only to the QKD module 2a at Step S11, because no mapping is performed again for the existing QKD modules 2a having been already mapped.

Because Steps S12 and S13 are the same as Steps S1 and S2 in the first embodiment, explanations thereof will be omitted.

The local instructing module 107 then determines whether there is any QKD module 2a having been instructed to start a key generation at Step S11 but failed in starting the key generation (Step S14).

If there is any QKD module 2a having failed in starting the key generation (Yes at Step S14), the remote instructing module 108 instructs the remote key management device 1b-2 connected thereto via the classical communication channel to generate a QKD key (Step S15), and the process is shifted to Step S16. By causing the remote QKD module 2b to start the key generation at Step S15, an operation of the key generation (key sharing) with the QKD module 2a having failed in starting the key generation (key sharing) can be normally performed. There are various possible causes of failures of the QKD module 2a in the key generation (key sharing), but some include an example in which the QKD module 2a does not have a function for receiving an instruction such as the command for starting the key generation (key sharing), or in which a setting of the QKD module 2a or the QKD module 2b prohibits the QKD module 2a to start a key generation (key sharing).

If there is no QKD module 2a having failed to start the key generation (No at Step S14), the process is shifted to Step S16.

Because Steps S16 and S17 are the same as Steps S3 and S4 in the first embodiment, explanations thereof will be omitted.

By contrast, when the reception control module 102 in the key management device 1b-2 receives the instruction of the key management device 1a-2 at Step S11 via the acquiring circuitry 11 (Step S21), the local instructing module 107 in the key management device 1b-2 instructs the QKD module 2b for which a key generation has been instructed, to start the key generation (Step S22).

Because Step S22 to S26 performed in the key management device 1b-2 are the same as Step S12, S13, S16 and S17 performed in the key management device 1a-2, explanations thereof will be omitted.

There are possible variations in the manner how Step S15 in the key management device 1a-2 and Step S21 in the key management device 1b-2 are implemented. For example, the key management device 1a-2 may issue an instruction for causing all of the QKD module 2a connected to the key management device 1b-2 to start the key generation to the key management device 1b-2.

As another example, the key management device 1a-2 may issue an instruction for causing the QKD module 2b having not started the key generation yet, among the QKD modules 2b connected to the key management device 1b-2, to start the key generation, to the key management device 1b-2.

As another example, the key management device 1a-2 may issue an instruction for causing a QKD module 2b newly connected to the key management device 1b-2 to start the key generation, to the key management device 1b-2.

Furthermore, the key management device 1b-2 may change a message representing an instruction by which the key management device 1a-2 causes the QKD module 2b connected to the key management device 1b-2 to start the key generation, or transfer the message as it is to the QKD module 2b. When the message is to be changed, for example, the local instructing module 107 in the key management device 1b-2 changes the destination address included in the message from the address of the key management device 1b-2 to the address of the QKD module 2b by which the key generation is to be started.

In this method, the key management device 1b-2 practically plays a role of a mediator, that is, serves as a tunnel between the key management device 1a-2 and the QKD module 2b.

With the key management method according to the second embodiment indicated in the flowchart in FIG. 6 described above, even while all or some of a plurality of QKD modules 2 have not started the key generation yet, the pairs of corresponding QKD modules 2 connected to a QKD link can be identified.

Figure 7:
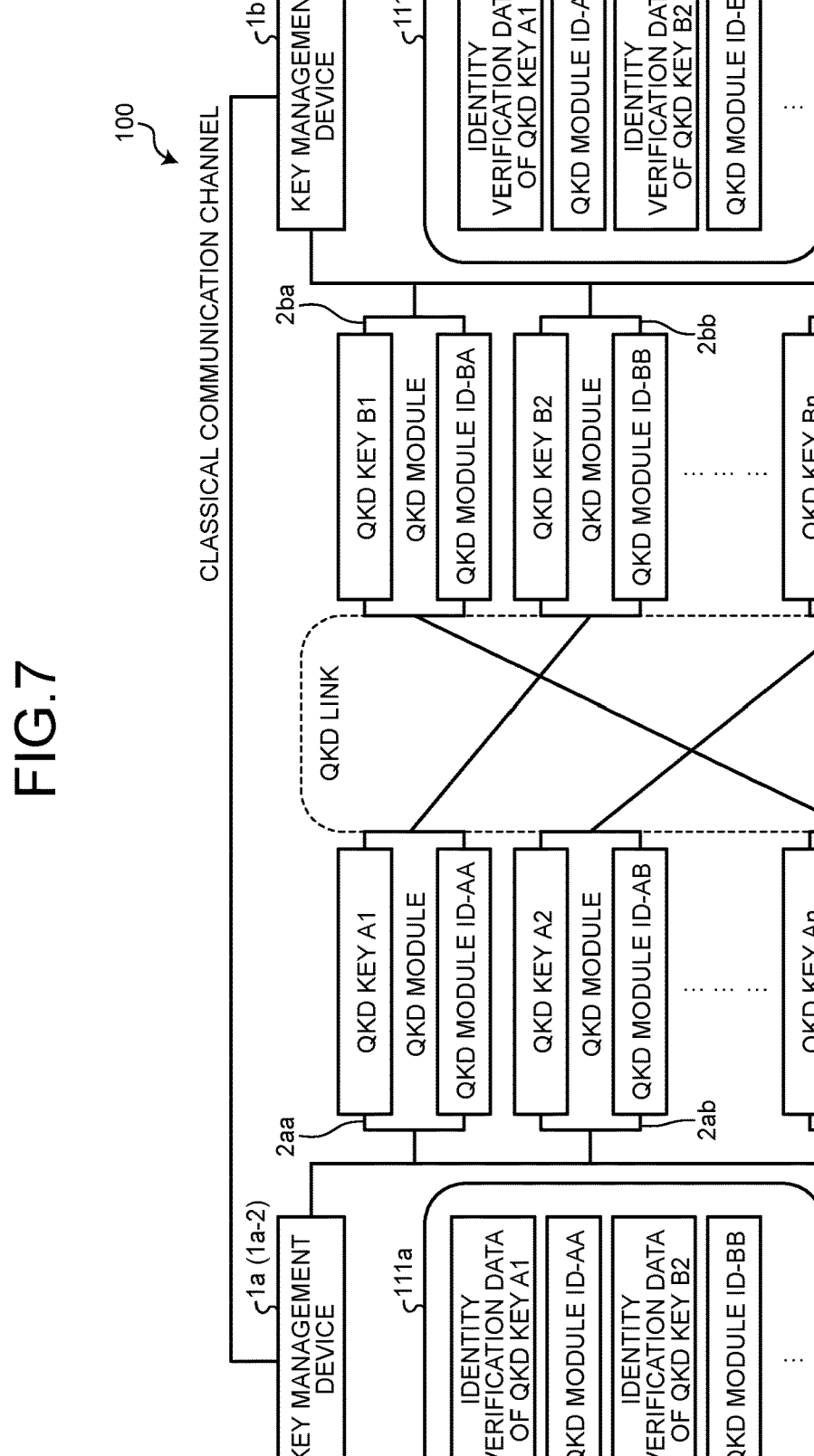
FIG. 7 is a schematic for explaining advantageous effects achieved by the first embodiment and the second embodiment.

FIG. 7 is a schematic for explaining advantageous effects achieved by the first embodiment and the second embodiment. As a result of the processes of the flowchart according to the first embodiment (FIG. 4) and the flowchart according to the second embodiment (FIG. 6), data 111a and 111b that is used in identity verifications of the QKD keys and verification result data 112a and data 112b are obtained.

The data 111a used in the identity verification of the QKD key of the key management device 1a (1a-2) includes a pair of identity verification data of a QKD key A1 and QKD module ID-AA for identifying the QKD module 2aa generating the QKD key A1, for example.

The data 111b used in the identity verification of the QKD key of the key management device 1b (1b-2) is similar to the data 111a used in the QKD key identity verification.

The verification result data 112a of the key management device 1a (1a-2) is data identified at Step S4 (FIG. 4) of the flowchart in the first embodiment and at Step S17 (FIG. 6) of the flowchart in the second embodiment. In the example illustrated in FIG. 7, it is identified that the QKD key A1 and the QKD key B2 are the same, as a result of matching of the identity verification data for the QKD key A1 with the identity verification data for the QKD key B2, and the QKD module ID-AA and the QKD module ID-BB are mapped to each other.

The verification result data 112b of the key management device 1b (1b-2) is data identified at Step S4 (FIG. 4) of the flowchart in the first embodiment and at Step S26 (FIG. 6) of the flowchart in the second embodiment. The verification result data 112b of the key management device 1b (1b-2) is similar to the verification result data 112a.

Described above in the first embodiment and the second embodiment is an example in which each of the key management device 1a (1a-2) and the key management device 1b (1b-2) share a pair of the QKD key identity verification data and the QKD module ID of the other. However, as mentioned earlier, because the data 111a and 111b used in the QKD key identity verification matches, and the verification result data 112a and 112b also matches, for example, the key management device 1a (1a-2) may collect, acquire, and verify the data 111a used in the QKD key identity verification. In such a case, for example, the key management device 1b (1b-2) receives the verification result data 112a from the key management device 1a (1a-2). As another example, the key management device 1b (1b-2) receives not only the verification result data 112a but also the whole or a part of the data 111a of the QKD key identity verification (e.g., the QKD key identity verification data and the QKD module ID of the remote QKD module 2a connected to the key management device 1a (1a-2)) from the key management device 1a (1a-2).

When one of the key management devices 1 (1-2) collects, acquires, and verifies the data 111 used in the QKD key identity verification, the key management device 1b (1-2) may do so, instead of the key management device 1a (1a-2).

Finally, an exemplary hardware configuration of the key management device 1 (1-2) and the QKD module 2 (2-2) according to the first embodiment and the second embodiment will now be explained.

Exemplary Hardware Configuration

Figure 8:
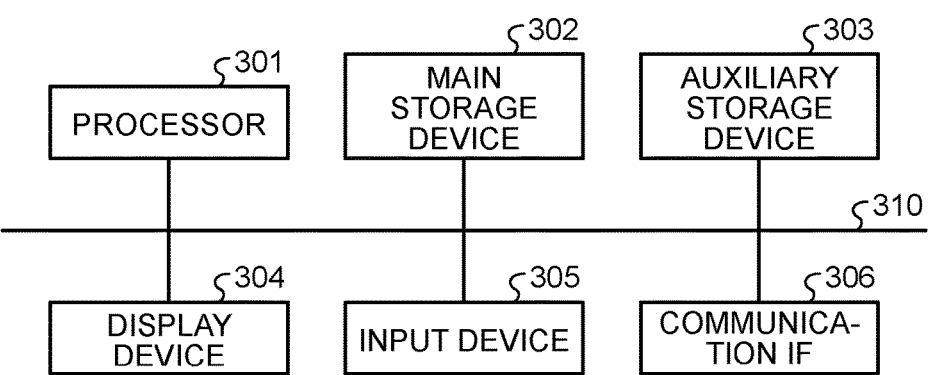
FIG. 8 is a schematic illustrating an example of a hardware configuration of the key management device according to the first embodiment and the second embodiment.

FIG. 8 is a schematic illustrating an example of a hardware configuration of the key management device 1 (1-2) according to the first embodiment and the second embodiment. The key management device 1 (1-2) according to the first embodiment and the second embodiment includes a processor 301, a main storage device 302, an auxiliary storage device 303, a display device 304, an input device 305, and a communication interface (IF) 306. The processor 301, the main storage device 302, the auxiliary storage device 303, the display device 304, the input device 305, and the communication IF 306 are connected to one another via a bus 310.

The processor 301 executes a computer program read from the auxiliary storage device 303 onto the main storage device 302. Instead of the processor 301 executing a computer program, an FPGA circuit may be implemented at register-transfer level (RTL), and the FPGA circuit may be caused to execute the process. The main storage device 302 is a memory such as a read-only memory (ROM) and a random access memory (RAN). The auxiliary storage device 303 is a hard disk drive (HDD) and a memory card, for example.

The display device 304 displays a status or the like of the key management device 1 (1-2). The input device 305 receives an input from a user. The key management device 1 (1-2) according to the first embodiment and the second embodiment is not necessarily provided with the display device 304 and the input device 305.

The communication IF 306 is an interface for connecting to the key management device 1 (1-2), the QKD module 2 (2-2), or the like. In a configuration in which the key management device 1 (1-2) does not include the display device 304 and the input device 305, for example, a display function and an input function of an external terminal connected via the communication IF 306 may be used.

Figure 9:
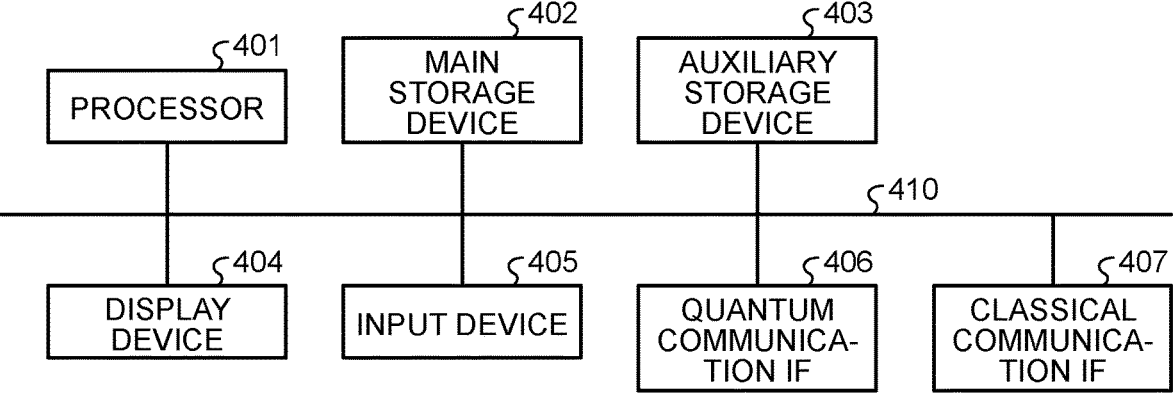
FIG. 9 is a schematic illustrating an example of a hardware configuration of the QKD module according to the first embodiment and the second embodiment.

FIG. 9 is a schematic illustrating an example of a hardware configuration of the QKD module 2 (2-2) according to the first embodiment and the second embodiment. The QKD module 2 (2-2) includes a processor 401, a main storage device 402, an auxiliary storage device 403, a display device 404, an input device 405, a quantum communication IF 406, and a classical communication IF 407. The processor 401, the main storage device 402, the auxiliary storage device 403, the display device 404, the input device 405, the quantum communication IF 406, and the classical communication IF 407 are connected to one another via a bus 410.

The processor 401 executes a computer program read from the auxiliary storage device 403 onto the main storage device 402. Instead of the processor 401 executing a computer program, an FPGA circuit may be implemented at RTL, and the FPGA circuit may be caused to execute the process. The main storage device 402 is a memory such as a ROM and a PAM. The auxiliary storage device 403 is an HDD or a memory card, for example.

The display device 404 displays a status or the like of the QKD module 2 (2-2). The input device 405 receives an input from a user. The QKD module 2 (2-2) is not necessarily provided with the display device 404 and the input device 405.

The quantum communication IF 406 is an interface for connecting to a quantum cryptography communication channel (QKD link). A classical communication IF 207 is an interface for connecting to the classical communication channel, the key management device 1 (1-2), and the like. In a configuration in which the QKD module 2 (2-2) does not have the display device 404 and the input device 405, for example, a display function and an input function of an external terminal connected via the classical communication IF 407 may be used.

The computer programs to be executed by the key management device 1 (1-2) and the QKD module 2 (2-2) are provided as computer program products as files in an installable or executable format, stored in a computer-readable storage medium such as a CD-ROM, a memory card, a CD-R, and a digital versatile disc (DVD).

The computer programs to be executed by the key management device 1 (1-2) and the QKD module 2 (2-2) may be stored on a computer connected to a network such as the Internet and made available for download over the network.

The computer programs to be executed by the key management device 1 (1-2) and the QKD module 2 (2-2) may be configured to be provided over a network such as the Internet, without being made available for download.

The computer programs to be executed by the key management device 1 (1-2) and the QKD module 2 (2-2) may be configured to be provided in a manner incorporated in a ROM or the like in advance.

The computer program to be executed by the key management device 1 (1-2) has a modular configuration including functions that can be implemented by the computer program, among those of the functional configurations of the key management device 1 (1-2) described above. By causing the processor 301 to read the computer program from a storage medium such as auxiliary storage device 303 and to execute the computer program, the functions implemented by the computer program are loaded onto the main storage device 302. In other words, the functions implemented by the computer program are generated on the main storage device 302.

In the same manner, the computer program to be executed by the QKD module 2 (2-2) has a modular configuration including functions that can be implemented by the computer program, among those of the functional configurations of QKD module 2 (2-2) described above. By causing the processor 401 to read the computer program from a storage medium such as auxiliary storage device 403 and to execute the computer program, the functions implemented by the computer program are loaded onto the main storage device 402. In other words, the functions implemented by the program are generated on the main storage device 402.

When the FPGA circuit is configured at RTL, instead of the processor 301 executing a computer program, the RTL executed in the key management device 1 (1-2) has a modular configuration including the functions that can be implemented by the RTL, among those of the functional configurations of the key management device 1 (1-2) described above. In this case, the functions implemented at RTL are generated on the FPGA circuit.

In the same manner, when the FPGA circuit is configured at RTL instead of the processor 401 executing a computer program, the RTL executed in QKD module 2 (2-2) has a modular configuration including the functions that can be implemented by the RTL, among the functional configurations of QKD module 2 (2-2) described above. In this case, the functions implemented at RTL are generated on the FPGA circuit.

Some or all of the functions of the key management device 1 (1-2) and the QKD module 2 (2-2) may be implemented as hardware such as an integrated circuit (IC). An example of an IC is, for example, a processor that perform dedicated processing, and FPGA circuitry.

When multiple processors are used to implement such functions, each processor may implement one of the functions or two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key management device that is connected to at least one local quantum key distribution (QKD) device connected to at least one remote QKD device via a quantum communication channel, the device comprising:

an acquiring circuitry configured to acquire identity verification data indicative of a remote QKD key generated by the remote QKD device, and remote QKD device identification information identifying the remote QKD device, from another key management device via a classical communication channel; and a processor configured to:

collect a local QKD key generated by the local QKD device, and local QKD device identification information identifying the local QKD device;

generate identity verification data indicative of the local QKD key; and map, when the identity verification data indicative of the remote QKD key matches the identity verification data indicative of the local QKD key, the remote QKD device identification information to the local QKD device identification information.

2. The device according to claim 1, further comprising an output circuitry configured to output the identity verification data of the local QKD key and the local QKD device identification information to the other key management device.

3. The device according to claim 1, wherein the identity verification data of the local QKD key includes whole or a part of the generated local QKD key having a predetermined length, and the identity verification data of the remote QKD key includes whole or a part of the generated remote QKD key having a predetermined length.

4. The device according to claim 1, wherein the identity verification data of the local QKD key includes a hash value generated from whole or a part of the generated local QKD key having a predetermined length, and the identity verification data of the remote QKD key includes a hash value generated from whole or a part of the generated remote QKD key having a predetermined length.

5. The device according to claim 1, wherein the processor is configured to instruct the local QKD device to start generating the local QKD key, and, when generation of the local QKD key fails, instruct the other key management device to start generating the remote QKD key.

6. The device according to claim 1, wherein the processor is configured to encrypt or decrypt data using a newly generated local QKD key that is different from the local QKD key used in generating the identity verification data of the local QKD key.

7. The device according to claim 1, wherein the processor is configured to:

when detecting a new local QKD device connected to the quantum communication channel, instruct the new local QKD device to generate a new local QKD key;

collect the new local QKD key and local QKD device identification information identifying the new local QKD device;

generate identity verification data of the new local QKD key; and map, when the identity verification data of the remote QKD key matches the identity verification data of the new local QKD key, the remote QKD device identification information to the local QKD device identification information identifying the new local QKD device.

8. The device according to claim 1, wherein the processor is configured to instruct the local QKD device to generate the local QKD key when an instruction for generating the local QKD key is received from the other key management device.

9. A quantum cryptography communication system comprising:

the key management device according to claim 1;

the other key management device;

the at least one local QKD device; and the at least one remote QKD device, the local QKD device comprising:

a quantum communication unit configured to generate the local QKD key via the quantum communication channel; and a classical communication unit configured to transmit the local QKD key and the local QKD device identification information via the classical communication channel, and the remote QKD device comprising:

a quantum communication unit configured to generate the remote QKD key via the quantum communication channel; and a classical communication unit configured to transmit the remote QKD key and the remote QKD device identification information via the classical communication channel.

10. A key management method for a key management device that is connected to at least one local quantum key distribution (QKD) device connected to at least one remote QKD device via a quantum communication channel, the method comprising:

causing an acquiring circuitry to acquire identity verification data indicative of a remote QKD key generated by the remote QKD device, and remote QKD device identification information identifying the remote QKD device, from another key management device via a classical communication channel; and causing a processor to collect a local QKD key generated by a local QKD device, and local QKD device identification information identifying the local QKD device;

generate identity verification data indicative of the local QKD key; and map, when the identity verification data indicative of the remote QKD key matches the identity verification data indicative of the local QKD key, the remote QKD device identification information to the local QKD device identification information.

11. A computer program product comprising a non-transitory computer-readable medium including programmed instructions, the instructions causing a computer, which is connected to at least one local quantum key distribution (QKD) device connected to at least one remote QKD device via a quantum communication channel, to execute:

causing an acquiring circuitry to acquire identity verification data indicative of a remote QKD key generated by the remote QKD device, and remote QKD device identification information identifying the remote QKD device, from another key management device via a classical communication channel; and causing a processor to collect a local QKD key generated by a local QKD device, and local QKD device identification information identifying the local QKD device;

generate identity verification data indicative of the local QKD key, and map, when the identity verification data indicative of the remote QKD key matches the identity verification data indicative of the local QKD key, the remote QKD device identification information to the local QKD device identification information.

12. A quantum cryptography communication system comprising:

the key management device according to claim 2;

the other key management device;

the at least one local QKD device; and the at least one remote QKD device, the local QKD device comprising:

a quantum communication unit configured to generate the local QKD key via the quantum communication channel; and a classical communication unit configured to transmit the local QKD key and the local QKD device identification information via the classical communication channel, and the remote QKD device comprising:

a quantum communication unit configured to generate the remote QKD key via the quantum communication channel; and a classical communication unit configured to transmit the remote QKD key and the remote QKD device identification information via the classical communication channel.

13. The device according to claim 1, wherein the processor is configured to:

when detecting a new local QKD device connected to the quantum communication channel, instruct the new local QKD device to generate a new local QKD key;

collect the new local QKD key and local QKD device identification information identifying the new local QKD device; and generate identity verification data of the new local QKD key.

14. The method according to claim 10, further comprising:

when detecting a new local QKD device connected to the quantum communication channel, causing the processor to:

instruct the new local QKD device to generate a new local QKD key;

collect the new local QKD key and local QKD device identification information identifying the new local QKD device; and generate identity verification data of the new local QKD key.

15. The computer program product according to claim 11, wherein the instructions cause the computer to further execute:

causing the processor to:

instruct the new local QKD device to generate a new local QKD key;

collect the new local QKD key and local QKD device identification information identifying the new local QKD device; and generate identity verification data of the new local QKD key.

* * * * *